United States Patent

Osaki et al.

(10) Patent No.: US 8,995,818 B2
(45) Date of Patent: Mar. 31, 2015

(54) RECORDER APPARATUS

(75) Inventors: Yoshiro Osaki, Kanagawan-ken (JP); Tomoaki Sugiyama, Kanagawa-ken (JP); Toshiki Mori, Tokyo (JP); Naoko Satoh, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1285 days.

(21) Appl. No.: 12/207,050

(22) Filed: Sep. 9, 2008

(65) Prior Publication Data

US 2009/0110365 A1 Apr. 30, 2009

(30) Foreign Application Priority Data

Oct. 29, 2007 (JP) ................................. 2007-280759

(51) Int. Cl.
*H04N 5/91* (2006.01)
*G11B 27/32* (2006.01)
*H04N 5/907* (2006.01)
*H04N 5/765* (2006.01)

(52) U.S. Cl.
CPC ............... *H04N 5/907* (2013.01); *H04N 5/765* (2013.01)
USPC ........... 386/241; 386/235; 386/248; 725/115; 725/116

(58) Field of Classification Search
USPC ......... 386/235–238, 243, 246, 248, 291–299, 386/241; 725/2, 32, 44, 50, 80, 115, 116, 725/37, 40, 59; 348/231.2, 231.99
See application file for complete search history.

(56) References Cited

U.S. PATENT DOCUMENTS

| 5,241,428 | A | 8/1993 | Goldwasser et al. |
| 6,766,100 | B1 | 7/2004 | Komar et al. |
| 7,197,228 | B1 * | 3/2007 | Monroe et al. ................. 386/234 |
| 2002/0054754 | A1 * | 5/2002 | Kikuchi et al. ................. 386/83 |

(Continued)

FOREIGN PATENT DOCUMENTS

| JP | 2002-260334 | 9/2002 |
| JP | 2003-309807 | 10/2003 |
| WO | WO 2006/021832 A1 | 3/2006 |

OTHER PUBLICATIONS

English Translation of Japanese patent application publication No. 2002-260334, 2002.*

(Continued)

*Primary Examiner* — Shewaye Gelagay
*Assistant Examiner* — Shanto M Abedin
(74) *Attorney, Agent, or Firm* — Oblon, McClelland, Maier & Neustadt, L.L.P.

(57) ABSTRACT

It is provided a recorder apparatus in which a user can use simply and efficiently plural functions which can be performed simultaneously. According to an embodiment of the invention, a recorder apparatus has a display, an input section for a video being inputted, a random access recording medium for recording the video, an output section for outputting the video recorded in the recording medium, a multitask control section, a display control section and a reception section for receiving an specification of the tab and the direction of the video for a processing target for the selected function. The multitask control section performs plural functions in parallel simultaneously which plural functions includes a function for recording the inputted video in the recording medium. The display control section displays tabs assigned to the plural functions respectively and processing situation of the function selected by specifying the tab on the display.

5 Claims, 7 Drawing Sheets

(56) References Cited

U.S. PATENT DOCUMENTS

| | | | |
|---|---|---|---|
| 2002/0154888 A1* | 10/2002 | Allen et al. | 386/46 |
| 2003/0023952 A1* | 1/2003 | Harmon, Jr. | 717/106 |
| 2003/0037335 A1 | 2/2003 | Gatto et al. | |
| 2004/0117825 A1* | 6/2004 | Watkins | 725/40 |
| 2005/0050135 A1* | 3/2005 | Hallermeier | 709/200 |
| 2006/0026637 A1* | 2/2006 | Gatto et al. | 725/37 |
| 2006/0056806 A1* | 3/2006 | Terakado et al. | 386/69 |
| 2006/0120692 A1* | 6/2006 | Fukuta | 386/95 |
| 2006/0171657 A1* | 8/2006 | Miura | 386/37 |
| 2006/0174266 A1* | 8/2006 | Gatto et al. | 725/37 |
| 2007/0101364 A1* | 5/2007 | Morita | 725/38 |
| 2007/0133607 A1* | 6/2007 | Park | 370/484 |
| 2007/0162940 A1* | 7/2007 | Pae et al. | 725/80 |
| 2007/0162949 A1* | 7/2007 | Nitta et al. | 725/134 |
| 2008/0180549 A1* | 7/2008 | Lee et al. | 348/231.2 |
| 2008/0219639 A1* | 9/2008 | Terashima et al. | 386/68 |

OTHER PUBLICATIONS

Japanese Office Action dated Feb. 21, 2012, in Japanese Patent Application No. 2007-280759 filed Oct. 29, 2007 (with English Translation).

Office Action issued Jun. 17, 2014 in European Patent Application No. 08015828.0.

* cited by examiner

RECORDER APPARATUS

CROSS REFERENCE TO RELATED APPLICATION

This application is based upon and claims the benefit of priority from the Japanese Patent Application No. 2007-280759, filed on Oct. 29, 2007, the entire contents of which are incorporated herein by reference.

FIELD OF THE INVENTION

This invention relates to a recording apparatus used for work/edit system etc. of a library video for broadcast.

DESCRIPTION OF THE BACKGROUND

While terrestrial digital broadcasting progresses and fusion of communication and broadcast progresses, digitization in a broadcast field progresses increasingly. Conventionally, a magnetic tape has been used for record of a video as a recording medium. However, study of a recorder apparatus using a semiconductor storage element, for example, a flash memory, as a recording medium is progressing because of progress of digitization and low-pricing of the semiconductor storage element. The flash memory is a rewritable non volatile semiconductor memory and has an advantage of high-speed random access. Since the flash memory does not have a mechanical moving part unlike the magnetic tape, the flash memory is excellent in vibration-proof.

The following documents are known as background technology, for example. Japanese patent application publication No. Tokkai 2005-229550 discloses a switcher which switches plural video inputs. Japanese patent application publication No. Tokkai Hei 10-164478 discloses an editing apparatus which enabled to edit a play list easily.

SUMMARY OF THE INVENTION

Accordingly, it is an object of the invention to provide a recorder apparatus in which an operator can simply and efficiently use plural functions which can be performed simultaneously.

According to an embodiment of the invention, a recorder apparatus has a display, an input section for a video being inputted, a random access recording medium for recording the video, an output section for outputting the video recorded in the recording medium, a multitask control section, a display control section and a reception section for receiving an specification of the tab and the direction of the video for a processing target for the selected function. The multitask control section performs plural functions in parallel simultaneously which plural functions includes a function for recording the inputted video in the recording medium. The display control section displays tabs assigned to the plural functions respectively and processing situation of the function selected by specifying the tab on the display.

DETAILED DESCRIPTION OF THE INVENTION

According to an embodiment of the invention, a recorder apparatus has a display, an input section for a video being inputted, a random access recording medium for recording the video, an output section for outputting the video recorded in the recording medium, a multitask control section, a display control section and a reception section for receiving an specification of the tab and the direction of the video for a processing target for the selected function. The multitask control section performs plural functions in parallel simultaneously which plural functions includes a function for recording the inputted video in the recording medium. The display control section displays tabs assigned to the plural functions respectively and processing situation of the function selected by specifying the tab on the display.

Figure 1:
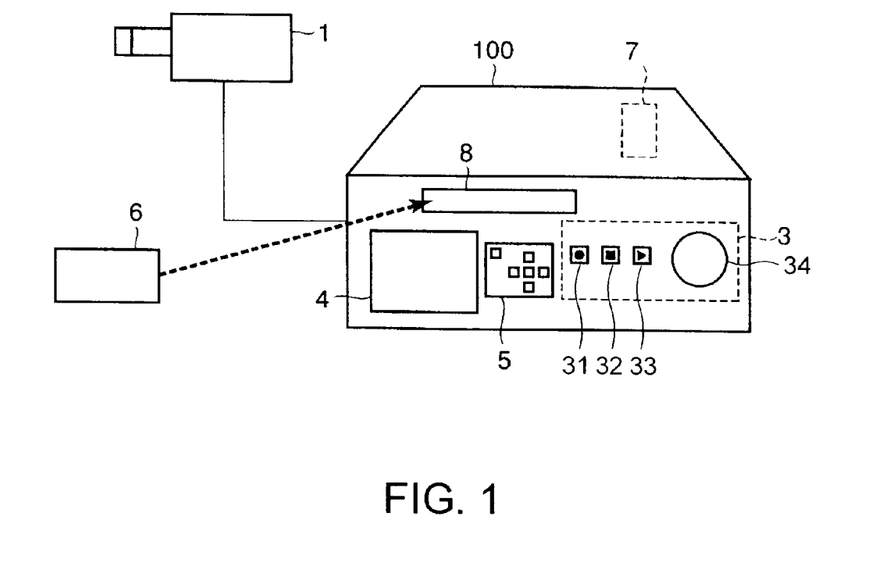
FIG. 1 is a general-view of a recorder apparatus according one embodiment of this invention.

Hereinafter, embodiments of this invention are explained in detail with reference to drawings. FIG. 1 is a general-view of a recorder apparatus according to the embodiment. Camera 1 is connected to recorder apparatus 100 and an video picturized with camera 1 is taken into recorder apparatus 100. A taken-in video is recorded in memory pack 6 which is a removable recording medium inserted in insertion slot 8, or built-in memory 7 built in recorder apparatus 100. Memory pack 6 and built-in memory 7 are random access recording media, and use non volatile semiconductor memories, such as a flash memory.

Video operation section 3, display 4 and screen operation section 5 are formed on front panel 9 of recorder apparatus 100. Display 4 is a LCD (Liquid Crystal Display), for example. By operating buttons 31, 32 and 33 and dial 34 of video operation section 3, a recorded video can be played, be edited, etc. Played video is outputted to an output interface (usually installed in a back of recorder apparatus 100), and the content of the video can be displayed on a screen of a monitor separately connected to recorder apparatus 100.

Figure 2:
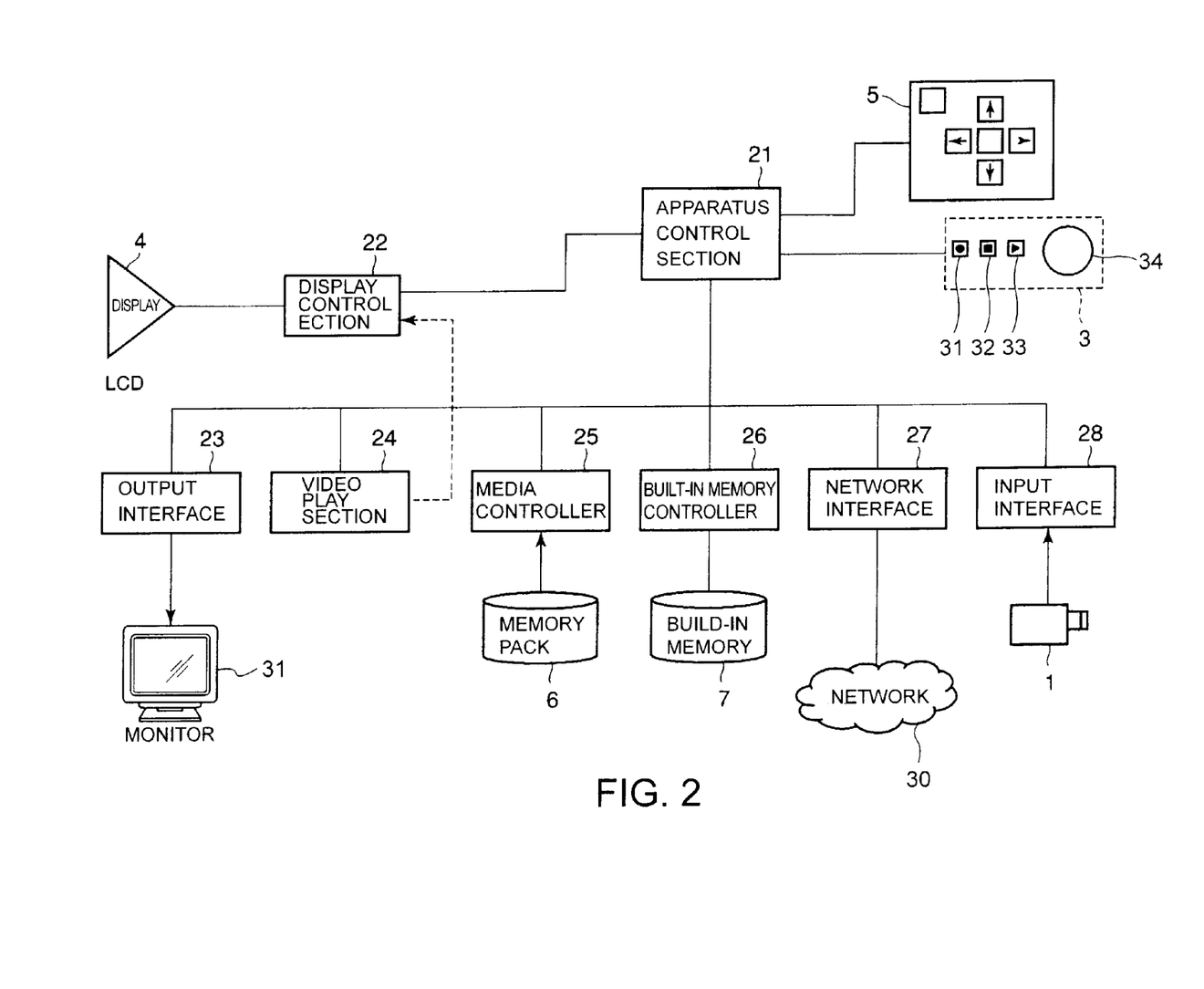
FIG. 2 is a functional block diagram showing an internal structure of the recorder apparatus shown in FIG. 1.

FIG. 2 is a functional block diagram showing an internal structure of the above-mentioned recorder apparatus 100. Apparatus control section 21 is a CPU (Central Processing Unit) which includes a microprocessor. Apparatus control section 21 takes in the video picturized with camera 1 via input interface 28 which is an input section, and records the taken-in video in memory pack 6 via media controller 25. Or apparatus control section 21 records the taken-in video in built-in memory 7 via built-in memory controller 26. Apparatus control section 21 can send out a recorded video to external network 30 via network interface 27.

Display control section 22 and video play section 24 are control programs executed by apparatus control section 21. Video play section 24 plays the video recorded in memory pack 6 or built-in memory 7 under control of apparatus control section 21 according to directions received with video operation section 3. Display control section 22 outputs the played video to display 4. And apparatus control section 21 outputs the played video to monitor 31 separately connected via output interface 23. Further, recorder apparatus 100 can copy the video recorded in memory pack 6 or built-in memory 7, clip a part of the video, stick, etc. As above-mentioned output interface 23, media controller 25 and network interface 27 function as an output section which outputs the video.

Since recorder apparatus 100 can access the videos in memory pack 6 or built-in memory 7 at random, recorder apparatus 100 can perform plural processes to one or more videos in parallel simultaneously. By display 4 and screen operation section 5, it becomes possible to begin to edit the video under recording from recorded portion, and play or edit other video recorded already while recording the video.

Display control section 22 displays tabs which are assigned respectively plural functions performed by multitasking by apparatus control section 21, and operation buttons for specifying a processing target for the function selected by the tab, on display 4. Input operation to specify the tab and operation button, etc. is performed by screen operation section 5. Further, display control section 22 has a function to display use situation of internal common resources (storage capacity, process capacity, processing function hardware, etc.) and status of reservation of processing which is in waiting state on display 4 according to screen change direction inputted by screen operation section 5. Screen operation section 5 functions as a reception section which receives the specification of the tab and the direction of processing target to selected function.

Hereinafter, detailed operation of recorder apparatus 100 constituted in this way is explained according to an embodiment. First, an embodiment which performs plural video processings in parallel is explained.

Figure 3A:
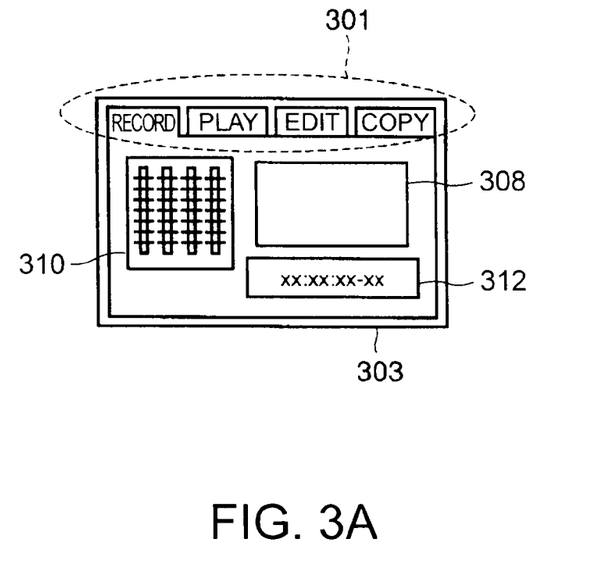
FIG. 3A is a drawing showing an example of an operation screen.

FIG. 3A shows an example of an operation screen displayed on display 4 by display control section 22. The operation screen displays tab 301 to which each function was assigned in index and status display area 303 which shows a status of processing performed by the function chosen with tab 301. Each function (record, play, edit, copy, file transfer, etc.) performed by multitasking by apparatus control section 21 is assigned to tabs 301, respectively. Apparatus control section 21 functions as a multitask control section which makes plural functions perform in parallel simultaneously.

If one of tabs 301 is chosen, display control section 22 displays thumbnails or a list of file names of the videos in status display area 303 for choosing an video used as a processing object of a chosen function. If the video is chosen by screen operation section 5, display control section 22 displays a situation of processing performed by the function specified with tab 301 in status-display area 303, for example. As shown in FIG. 3A, a video under recording is displayed in area 308, an amplitude of audio is displayed in area 310 about four frequency bands, and recording time is displayed in area 312. As mentioned above, display control section 22 displays tabs assigned plural function respectively and a processing situation of the function chosen by specifying the tab, on display 4.

Figure 3B:
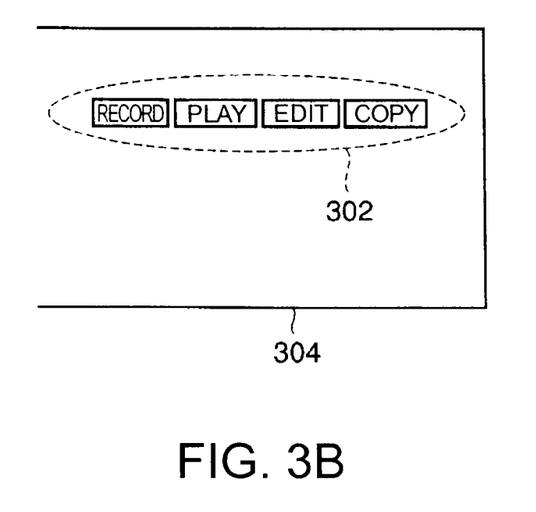
FIG. 3B is a drawing showing a functional button provided on a front panel.

As shown in FIG. 3B, each of functions can be clearly displayed by providing functional buttons 302 for exclusive use for each function on front panel 9. For example, functions, such as recording, playback, editing, copying and file transferring, are assigned to functional buttons 302, respectively. If one of functional buttons 302 is chosen, display control section 22 changes tab 301 of a function corresponding to selected functional button 302 into a selective state, and displays a processing situation of the function in status display area 303. Moreover, if display 4 is formed with a touch panel and selection of the function is made by touch of the tab corresponding to the function, further user-friendly operation can be realized.

Figure 4A:
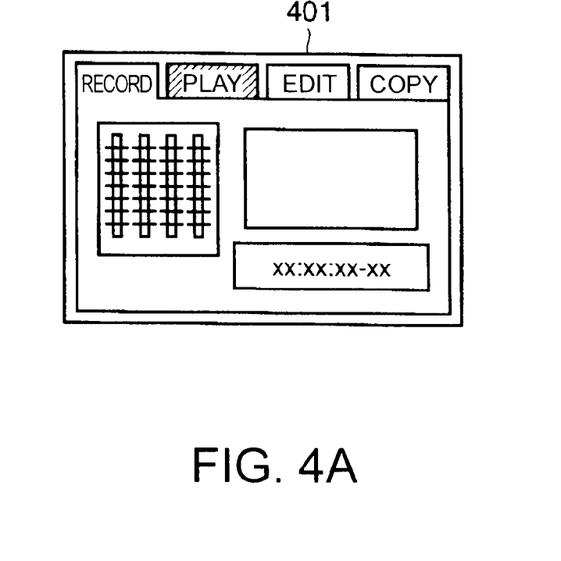
FIG. 4A is a drawing showing an example of the operation screen.

Other example of an operation screen is shown in FIG. 4A. A tab to which each function was assigned by the index method mentioned above is displayed in operation screen 401 as well as FIG. 3A, and further each tab indicates a running state of each function. For example, the running state is indicated by coloring the tab. For example, with reference to the tab of play function, the tab is colored by green during play and is colored by grey during halt. That is, display control section 22 displays the running state of each function on the tab corresponding to each function.

Figure 4B:
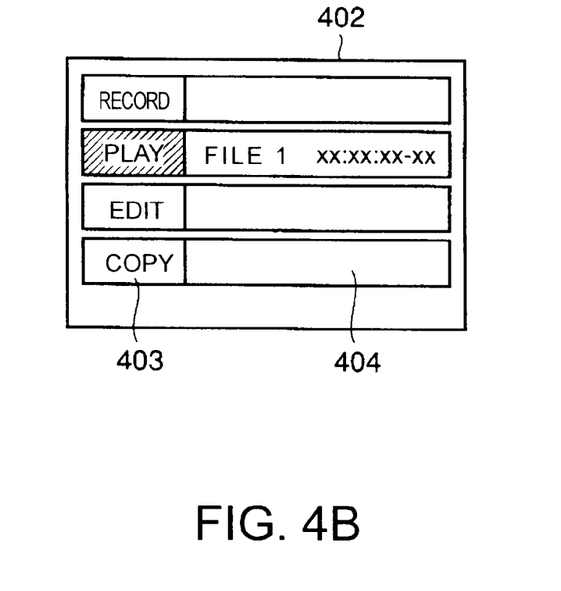
FIG. 4B is a drawing showing an example of the operation screen which shows a processing situation.

FIG. 4B shows operation screen 402 which displays a situation of the processing performed by each function by a list. Names of functions, such as record, play, edit, copy, etc. are displayed in function name column 403, and an outline of the processing state of each function is shown in processing state column 404. Although operation screen 401 can show detailed information which includes the contents of processing about one function, the processing state of other function is simple to recognize under execution or halt. Compared with this, operation screen 402 shows the processing state of each function somewhat in detail, and an outline of the processing situation of all the functions is known by one screen.

Figure 5:
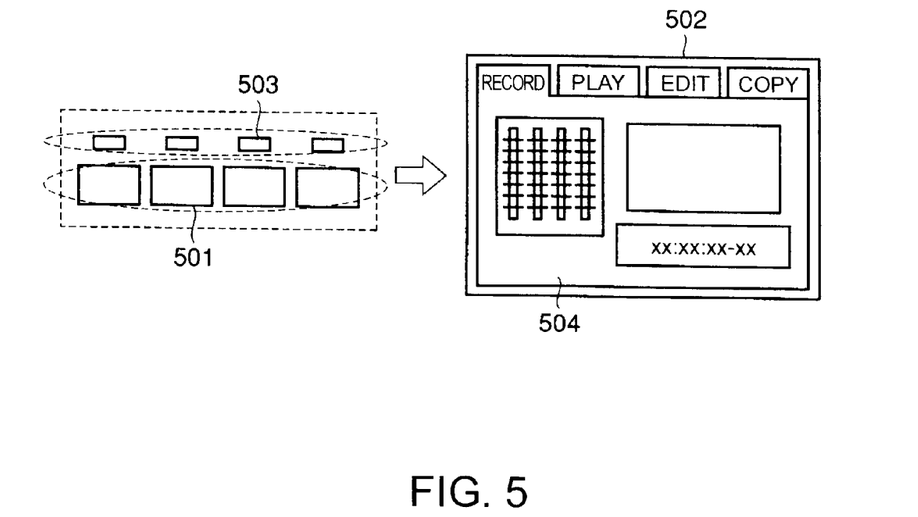
FIG. 5 is a drawing showing a relationship between selection of each function and the operation screen.

FIG. 5 shows a relationship between selection of each function and the operation screen. For example, functional button 501 for exclusive use for each function and indicator 503 which indicates main state of each function are provided on front panel 9. Lamps are used for indicator 503, for example. If one of functional buttons 501 is chosen, indicator 503 corresponding to the button chosen lights up and operation screen 502 is displayed on display 4. For example, when the functional button of record is pushed, operation screen 502 displays detailed information about the record function corresponding to the record button in status display area 504. Functional button 501 functions as the reception section. And indicator 503 provided corresponding to each function button 501 shows the running state of each function.

As mentioned above, since tab portions of other functions other than the function chosen are also displayed in the visible state, plural functions currently performed simultaneously can be judged visually and simultaneously. With constituting as mentioned above, plural functions which can be performed simultaneously can be used simply and efficiently.

Next, other embodiments which display a use situations of resources which become common to plural functions processed simultaneously are explained. In addition, in each embodiment explained below, recording apparatus 100 is similar to that of the structure shown in FIG. 1 and FIG. 2. Therefore general-view and a functional block diagram of recording device 100 and their explanations are omitted. Each following embodiment is explained especially about a portion that is different from the above-mentioned embodiment.

Figure 6:
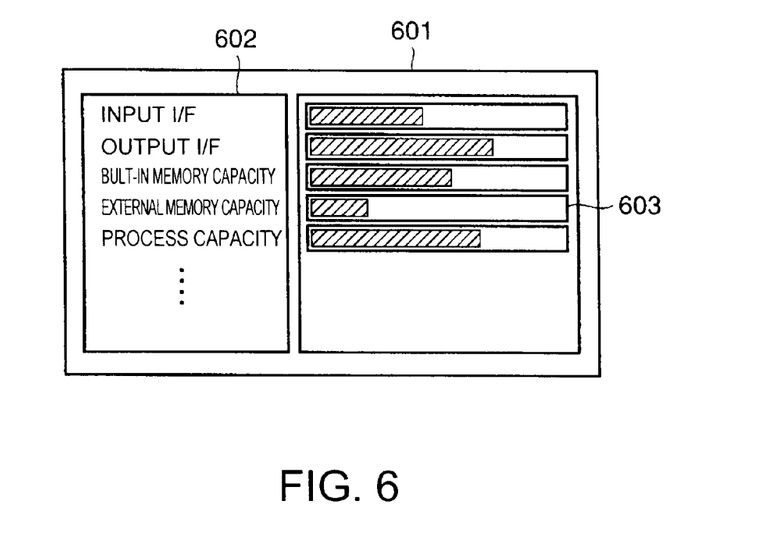
FIG. 6 is a drawing showing an example of a resource display screen.

FIG. 6 shows an example of a resource display screen displayed on display 4 by display control section 22. For example, each of the play function and the edit function needs video play section 24 for playing a target video, respectively. However, if recorder apparatus 100 has only one set of video play section 24, one of the functions can not be performed. Resource display screen 601 is displayed on display 4 so that an operator can judge such a situation clearly. Resource display screen 601 displays resource list column 602 which indicates a list of the common resources, and resource usage column 603 which indicates each resource usage of each of the common resources. That is, display control section 22 displays use situations of input interface 28, built-in memory 7, memory pack 6 which are recording mediums, output interface 23, network interface 27 and apparatus control section 21 which is a multitask control section, etc.

Figure 7:
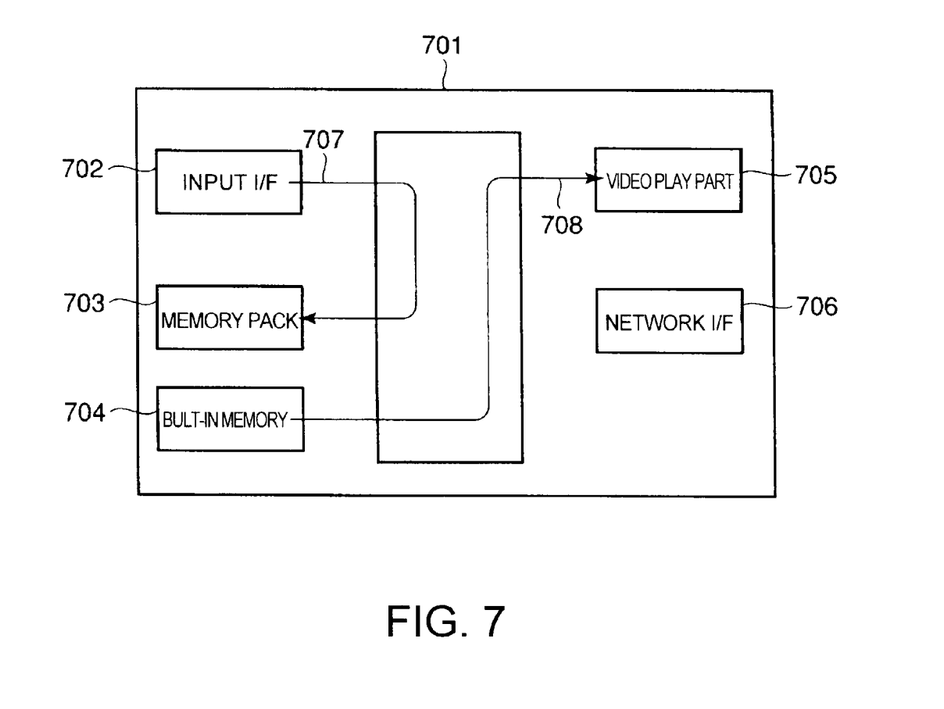
FIG. 7 is a drawing showing other example of the resource display screen.

FIG. 7 shows other example of a screen which shows the use situation of the resources in recording apparatus 100 visually. Resource display screen 701 shows input interface 702, memory pack 703, built-in memory 704, video play section 705, network interface 706, etc. and signal flow among those in visible. Arrow 707 shows that an video inputted into input interface 707 is recorded in memory pack 703. Arrow 708 shows that an video recorded in built-in memory 704 is played by video play part 705.

As mentioned above, the operator can recognize the resource with much processing loads easily by displaying visually processing currently performed simultaneously. Therefore, the operator can use plural functions efficiently.

Next, an embodiment in which recording device 100 of which operation is fitted to the operation of a tape type recording device is explained.

Figure 8A:
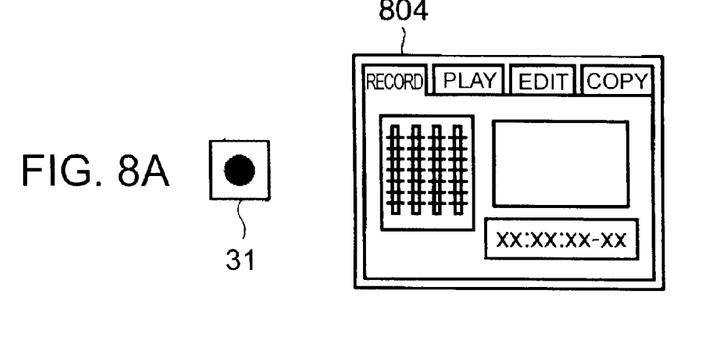
FIGS. 8A, 8B and 8C are drawings showing correspondence relation between operation of a tape type recorder apparatus and operation of the recorder apparatus of the invention, respectively.
Figure 8B:
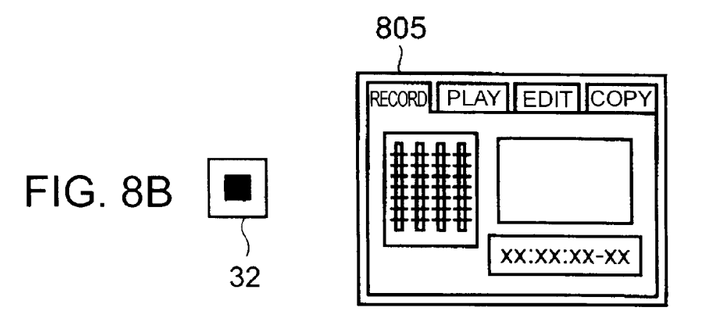
Figure 8C:
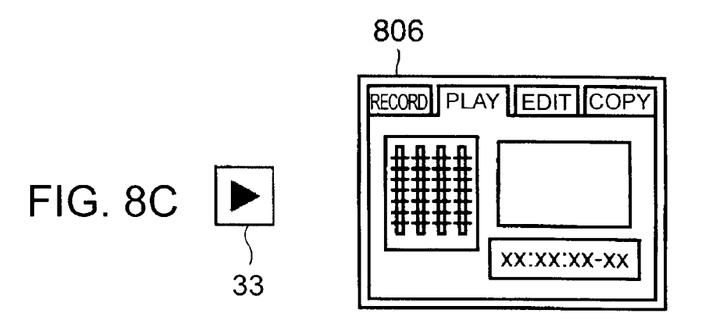

Correspondence relation between operation of the tape type recorder apparatus and operation of recorder apparatus 100 is shown in FIGS. 8A, 8B and 8C. As shown in FIGS. 1 or 2, video operation section 3 and screen operation section 5 are formed on front panel 9 of recorder apparatus 100. Video operation section 3 is provided with record button 31, stop button 32 and play button 33. These operation buttons are provided with symbols similar to symbols provided on the operation buttons of the conventional tape type recorder apparatus. By recorder apparatus 100 according to this embodiment, to the operator who imagines tape operation, operation by only the operation buttons of video operation section 3 is made possible. FIG. 8A shows operation screen 804 displayed when record button 31 is pushed. FIG. 8B shows operation screen 805 displayed when stop button 32 is pushed. FIG. 8C shows operation screen 806 displayed when play button 33 is pushed. Operation screens 804, 805 and 806 are as common as the operation screens which are displayed by other operations explained in other embodiment.

In performing plural processings simultaneously, operation becomes complicated naturally. However, to an operator who wishes conventional single task operation, the operation fitted to the operation of the conventional recorder apparatus can be realizable as mentioned above by limiting the video to be operated target and omitting the operation necessary for selection of plural functions. In this case, the target video is limited to "video currently recording", "video recorded last" and "video in the recording medium inserted last (video recorded on a head in the recording medium)".

Although the operation is performed by specifying "functions", such as record, play, copy, in the embodiment mentioned above, an embodiment in which operation is performed by specifying "videos" is explained.

Figure 9:
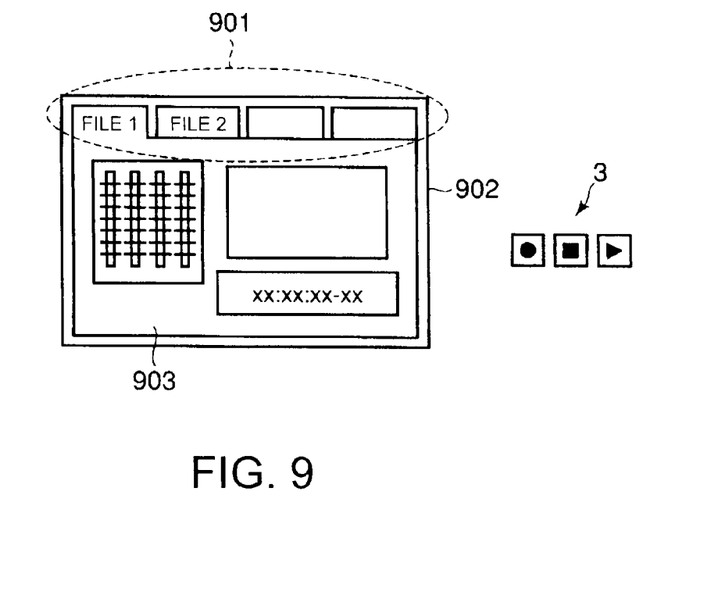
FIG. 9 is a drawing showing an example of the operation screen.

FIG. 9 shows an example of an operation screen displayed on display 4 by display control section 22. A video for a processing object can be specified by specifying the recording medium in which the video is recorded and its file name. Plural videos can be specified and the specified video is assigned to each tab. Tab 901 is displayed in operation screen 902 on display 4 for every video. For each video, information about functions currently executed, such as record, play, edit, etc. is displayed in status display area 903 in operation screen 902. When processing the video, the tab of the target video is chosen by screen operation section 5 first. And to the selected video, processing of play, stop, etc. are specified by video operation section 3, and the processing is performed. A processing situation of the video is displayed in status display area 903 of operation screen 902.

Next, other embodiment is explained. In this embodiment, working efficiency is increased by reserving even if plural functions in which execution are specified become in a waiting state because of a resource competition.

Figure 10A:
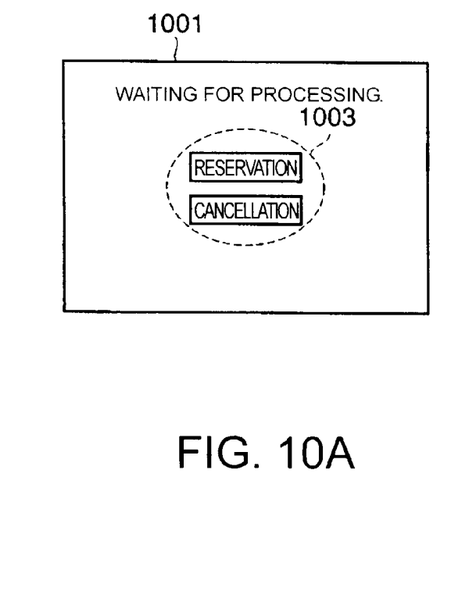
FIG. 10A is a drawing showing an example of the reservation screen.

FIG. 10A shows an example of a reservation screen displayed on display 4 by display control section 22. After a processing to a certain function was specified, when a state of the processing is changed to the state waiting for processing because of a resource competition at the time, reservation screen 1001 displays that the specified processing is waiting state. Reservation screen 1001 also displays selection button 1003 for selecting "reservation" or "cancel". If "reservation" is chosen, reservation information which indicates detail of the contents of processing is registered to a reservation list (not shown) which is held by apparatus control section 21, and the reservation is accepted. Apparatus control section 21 executes sequentially the functions specified by the reservation information according to the order of registration etc. to the reservation list.

Figure 10B:
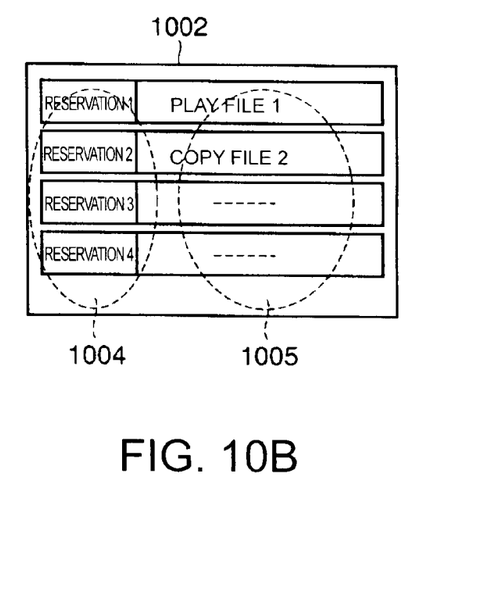
FIG. 10B is a drawing showing an example of a screen showing a list of reservation information.

FIG. 10B shows an example of a screen which shows the list of the reservation information. In display screen 1002, reserved function names (record, play, copy, file transfer, etc.) are displayed in function name column 1004 and the detailed information of the reservation about the function is shown in detailed information column 1005. Although a reservation is executed by order registered in the reservation list, it is possible to exchange the sequence and cancel the registration according to a situation.

Even when the specified function can not be performed because of competition of the resource etc. at the time, working efficiency can be improved by reserving the processing.

As explained above, in the above-mentioned embodiment, plural functions which can be performed by multitasking are displayed with tabs at once, and it becomes possible to direct processing to the function by specifying and choosing the tab. Thus, with constituting, it becomes possible to offer the user interface with which the operator can operate video processing efficiently without getting confused, using the display screen prepared in the limited spaces, such as the front panel of the recording device.

Therefore, according to the above-mentioned embodiments, it becomes possible to realize the recording apparatus which the user can simply and efficiently master plural functions which can be performed simultaneously.

Other embodiments or modifications of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:
1. A recorder apparatus, comprising:
a display including a screen;
an input section for a video being inputted;

a random access recording medium for recording the video;

an output section for outputting the video recorded in the recording medium;

a multitask control section configured to perform plural functions in parallel simultaneously, the plural functions including a function for recording the inputted video in the recording medium and a function for playing the video recorded in the recording medium, a display control section for displaying tabs assigned to the plural functions respectively in a manner to distinguish a tab specified from other of the tabs on the screen of the display; and displaying, a processing situation of the function selected by specifying the tab on the screen of the display, the display control section further displays on the screen a running state of each of the plural functions, including non-selected functions, by changing a color of each of the tabs for each corresponding function, and the display control section further displays on the screen a processing state of each of the plural functions; and a reception section for receiving a specification of the tab and the direction of the video for a processing target for the selected function.

2. The recorder apparatus according to claim 1, wherein said display control section displays use situations of the input section, the recording medium, the output section, and the multitask control section.

3. The recorder apparatus according to claim 1, wherein the multitask control section receives a reservation of the processing when the processing directed by the reception section becomes a state waiting for execution.

4. The recorder apparatus according to claim 1, wherein said display control section displays a list of a name of each function and the processing situation of each function.

5. A recorder apparatus, comprising:

a display including a screen;

a random access recording medium for recording plural the video;

an output section for outputting a selected the video selected in the plural videos recorded in the recording medium;

a multitask control section configured to perform plural functions in parallel simultaneously, the plural functions including a function for recording the inputted video in the recording medium and a function for playing the video recorded in the recording medium, a display control section for displaying plural tabs assigned to the plural videos respectively in a manner to distinguish a tab specified from other of the tabs on the screen of the display and displaying a processing situation of the selected video selected by specifying the tab on the screen of the display; the display control section further displays on the screen a running state of each of the plural functions, including non-selected functions, by changing a color of each of the tabs for each corresponding function, and the display control section further displays on the screen a processing state of each of the plural functions; and a reception section for receiving a specification of the tab and the direction of the processing for the selected video.

* * * * *